United States Patent
King et al.

[11] 3,720,690
[45] March 13, 1973

[54] PHARMACEUTICALLY ACTIVE BIS-CARBOXYCHROMONE COMPOUNDS

[75] Inventors: John King, Sandbach; George Harry Lord, Hale, both of England

[73] Assignee: Fisons Pharmaceuticals Limited, Loughborough, England

[22] Filed: May 8, 1970

[21] Appl. No.: 35,925

Related U.S. Application Data

[63] Continuation-in-part of Ser. No. 668,931, Sept. 19, 1967, abandoned.

[30] Foreign Application Priority Data

April 10, 1970    Great Britain.....................17,082/70

[52] U.S. Cl. .........260/345.2, 260/345.5, 260/295 F, 260/268 BC, 260/293.58, 260/247.2 R, 260/326.3, 260/250 R, 424/283
[51] Int. Cl. ...............................................C07d 7/34
[58] Field of Search...........260/345.2, 345.5, 295 F, 260/293.58, 268 BC, 250 R, 247.2 R, 326.8, 326.87, 326.3

[56] References Cited

UNITED STATES PATENTS 3,427,324  2/1969  Fitzmaurice...................260/345.2 X
3,484,445  12/1969  Lee et al........................260/345.5 X

*Primary Examiner*—John M. Ford
*Attorney*—Wenderoth, Lind & Ponack

[57]  ABSTRACT

Novel compounds of the formula

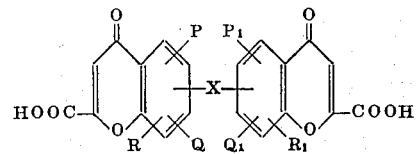

the substituents P, Q, R, $P_1$, $Q_1$ and $R_1$ being defined in the specification, useful for inhibiting the effects of antibody-antigen reaction, are provided, as well as a method for the preparation thereof and pharmaceutical compositions containing these compounds.

16 Claims, No Drawings

PHARMACEUTICALLY ACTIVE BIS-CARBOXYCHROMONE COMPOUNDS

The present invention relates to novel compounds, their preparation and use and is a continuation-in-part of our application Ser. No. 668,931 filed Sept. 19, 1967, now abandoned.

Accordingly, the present invention provides compounds of the formula:

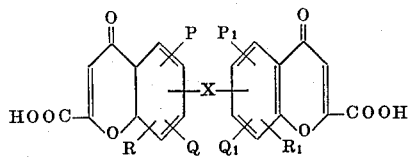

I and functional derivatives thereof wherein X is selected from carbocyclic and heterocyclic ring and straight or branched, saturated or unsaturated, substituted or unsubstituted hydrocarbon chains which chains may optionally be interrupted by at least one carbocyclic or heterocyclic ring or oxygen or nitrogen atoms; and P, Q, R, $P_1$, $Q_1$ and $R_1$ may be the same or different and each is selected from hydrogen, nitro, amino, aminoalkoxy (e.g. amino lower alkoxy), cyano, halogen, hydroxy, lower alkyl, lower alkenyl, lower alkynyl, lower alkoxy, lower alkenyloxy, lower alkynyloxy, such groups optionally carrying at least one of hydroxy, halogen, alkyl (e.g. lower alkyl) or alkoxy (e.g. lower alkoxy) substituent groups.

The term "substituted hydrocarbon chain" is intended to denote herein not only chains where one or more of the carbon atoms therein is in the form of a substituted methylene group carrying one or two substitutents linked to the carbon atom by single bonds, but also those groups wherein a substituent is linked to the carbon by a double bond, as with a

group or a

group. Thus, —X— may be a chain having either or both terminal atoms or one or more carbon atoms in the chain as

groups.

The term lower is used herein to denote a group containing from 1 to 8 carbon atoms.

The —X— group may have any of the values given above. Where a carbon atom in the —X— chain carries a substituent, the substituted carbon atom may be of the formula

wherein each $R^4$ may be the same or different and is hydrogen, hydroxy, halogen (e.g. chlorine or bromine), alkyl (e.g. lower alkyl) or alkoxy (e.g. lower alkoxy), which may optionally carry substituents such as halogen, hydroxy, carboxy or lower alkoxy groups (e.g. methyl, ethyl, propyl, hydroxy methyl, hydroxy propyl and chloro methyl groups). As indicated above, the substituted carbon atom may carry substituents linked thereto by double bonding, as in the case with the groups

Where the —X— chain is interrupted by nitrogen atoms, these may be substituted, i.e. by substituted or unsubstituted

groups. The substituted

groups may have the general formula —$NR^5$— wherein $R^5$ is for example an alkyl (e.g. a lower alkyl such as methyl, ethyl or propyl group), or aryl group (e.g. a phenyl group), which may optionally carry substituents such as hydroxy, halogen, alkyl, (e.g. lower alkyl), alkoxy (e.g. lower alkoxy) or aryl (e.g. phenyl) groups.

Examples of the —X— group include divalent groups derived from carbocyclic rings such as benzene, naphthalene, cyclopentadiene, cycloheptane, cyclopentane or cyclohexane rings; from heterocyclic rings such as pyridine, piperidine, piperazine, pyrazine, pyrrolidine, morpholine or pyrone rings; and from substituted carbocyclic or heterocyclic rings, for example the above rings carrying hydroxy, halogen or alkyl (e.g. lower alkyl) substituents either on carbon atoms in the ring or upon one or more of the heteroatoms if appropriate. X may also be a chain such as:

—$(CH_2)_5$—,
—$CH_2$—CH=CH-$CH_2$—,
—$CH_2CH_2$—$CH(CH_3)$—$CH_2CH_2$—,
—$CH_2CH_2$O $CH_2$ $CH_2$—,
—$CH_2$—CO—$CH_2$—,

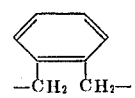

—$CH_2$—CH ($OC_2H_5$)$CH_2$—,

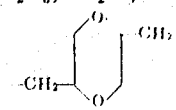

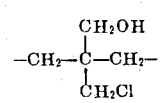

—$CH_2$—CHOH—$CH_2$—, —$CH_2$—CHOH—$CH_2$—CHOH—$CH_2$—,

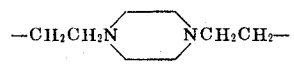

—CH₂CHOHCH₂OCH₂CHOHCH₂—
—CH₂—CH₂—NH—CH₂—CH₂—,

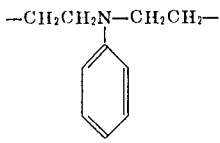

—CH₂CH₂—N(Me)—CH₂—CH₂—,
—CH₂—NH—CH₂—CH₂—O—CH₂—,
—COO—CH₂—CH₂—OOC—,
—CO—CH₂—CH₂—CH₂—CO—, and
—CONH—CH₂—NHCO—.

However, it is particularly preferred that the group —X— be nitrogen containing heterocyclic ring (e.g. a piperazine ring), a saturated or unsaturated, straight or branched polymethylene chain containing from 2 to 10 atoms in the chain and which may carry one or more halogen (e.g. chlorine or bromine) carbonyl oxygen, lower alkyl, lower alkoxy or hydroxyl substituents and may be interrupted by one or more oxygen atoms or

NH groups. Examples of such polymethylene chains include the groups —CH₂CHOHCH₂—, —(CH₂)$_p$— and —CONH(CH₂)$_p$NHCO— where $p$ has a value of from 2 to 8 preferably 3 to 6.

The group X may be bonded between any two of the 5, 6, 7 or 8 position on each of the chromone nuclei. Moreover, the linkage need not be between the same position on each nucleus. Thus, linkage may occur between, say, the 5 and 6¹ positions. However, it is preferred that the linkage be between the same positions on each chromone nucleus, notably upon the 6 and 6¹ and 7 and 7¹ positions.

The P, Q, R, P₁, Q₁ and R₁ substituents need not all be the same and may be selected from a number of groups. Examples of suitable groups include alkyl groups, notably those containing from 1 to 8 carbon atoms, which may be straight or branched (such as methyl, ethyl or isopropyl groups) and which may carry one or more substituents, such as hydroxy, lower alkoxy or halo groups, e.g. a hydroxymethyl, hydroxypropyl, ethoxyethyl, or chloromethyl group; alkoxy groups corresponding to such alkyl groups, e.g. an isopropoxy, hydroxypropoxy group or ethoxyethoxy group; alkenyl or alkenyloxy groups corresponding to such alkyl or alkoxy groups (e.g. an allyl or allyloxy group); amino groups which may carry substituents, such as a mono- or di-lower alkyl amino group; aminoalkoxy groups which may carry substituents such as a di-lower alkylamino lower alkoxy group; a nitro group; an hydroxy group; or an halogen atom. Specific examples of suitable groups are chloro, bromo, iodo, hydroxy, nitro, cyanol, methyl, ethyl, propyl, butyl, tert. butyl, allyl, 1-methylallyl, prop-1-enyl, prop-1-ynyl, methoxy, ethoxy, propoxy, butoxy, allyloxy, but-3-enoxy, but-3-ynoxy, hydroxymethyl, ethoxymethyl, chloromethyl, 2-chloroethoxy, 2-iodoethoxy, 2-hydroxyethoxy, 2-hydroxypropoxy, 3-hydroxypropoxy, 2,3-dihydroxypropoxy 2-hydroxybutoxy, 3-methylbutoxy, 2-ethoxyethoxy, 3-methoxy-2-hydroxypropoxy, 3-butoxy-2-hydroxypropoxy, diethylaminoethoxy and aminoethylamino. It is, however, preferred that P, Q, R, P₁, Q₁ and R₁ all be hydrogen.

It will be appreciated that certain of the above values of P, Q, R, P₁, Q₁ and R₁ may include groups which could be detrimentally affected by the reactants and/or reactant conditions used to introduce other groups into the molecule. In such cases the susceptible group may be blocked or shielded, for example by alkylation, acetylation or benzylation for all or part of the processes during which the compounds of formula I are prepared; or the blocking of the reactive site by a removable group, such as a cyano or nitro group, which may be removed at the end of a preparative process to permit introduction of the desired group or hydrogen atom in a final stage. The values for the P, Q, R, P₁, Q₁ and R₁ groups given herein are therefore to be construed to include, where permissible, a shielded or blocked precursor or derivative of the desired value for the substituent. The presence of a blocking group on the benzene ring may have the formation of the desired —CO—CH=C(COOH)—O— chain (i.e. the formation of the desired pyrone ring to be described later) occurs between the correct positions on the benzene ring and not on others.

Preferred compounds of formula I are those wherein X is a 6-membered nitrogen containing heterocyclic ring (e.g. a piperazine ring), a saturated or unsaturated, straight or branched polymethylene chain containing from 2 to 10 carbon atoms in the chain and which may optionally carry one or more of halogen, carbonyl oxygen, lower alkyl, lower alkoxy or hydroxyl substituents and may be interrupted by one or more oxygen atoms or

NH groups; and P, Q, R, P₁, Q₁ and R₁ may be the same or different and each is selected from hydrogen, hydroxy, halogen, amino, nitro, lower alkyl, lower alkenyl, lower alkoxy or lower alkenyloxy groups and such groups carrying one or more of halogen, hydroxy, lower alkyl and lower alkoxy substituents.

The term functional derivatives as used herein includes the pharmaceutically acceptable salts (notably the water-soluble salts), esters and amides of the carboxylic acid groups necessarily present on the chromone nuclei, and also these and other derivatives of other functional groups elsewhere in the molecule.

Salts which may be mentioned include salts with physiologically acceptable cations, e.g. an ammonium salt, alkali-metal (e.g. sodium, potassium or lithium) or alkaline-earth metal (e.g. calcium or magnesium) salts and salts with organic bases, e.g. a mono-, di or tri-lower alkyl- or lower alkanol-amine (e.g. triethylamine or triethanolamine), or a heterocyclic amine e.g. pyridine or piperidine.

Esters which may be mentioned include simple alkyl esters derived from alcohols containing from 1 to 10 carbon atoms (e.g. a methyl, ethyl, propyl or pentyl ester) from organic acids containing from 1 to 10 carbon atoms.

Amides which may be mentioned include simple amides derived from ammonia or from primary or secondary aliphatic or aromatic amines, such as mono- or diplower alkyl amines or aniline and from organic acids containing 1–10 carbon atoms; and more complex amides derived from amino acids, e.g. glycine. The amides may be in the form of an acid addition salt thereof, e.g. a hydrochloric acid salt.

It is also within the scope of the present invention to provide compounds of formula I possessing similar functional groups in the form of different derivatives thereof. Thus one carboxyl group may be in the form of an ester whereas another is in the form of a salt.

The new compounds of the invention inhibit the release and/or action of toxic products which arise from the combination of certain types of antibody and specific antigen, e.g. the combination of reaginic antibody with specific antigen. In man, both subjective and objective changes which result from the inhalation of specific antigen by sensitized subjects are inhibited by administration of the new compounds. Thus, the new compounds are of value in the treatment of 'extrinsic' allergic asthma. The new compounds are also of value in the treatment of so-called 'intrinsic' asthma (in which no sensitivity to extrinsic antigen can be demonstrated) and in the treatment of other conditions in which antigen reactions are responsible for disease, for example, hay fever, urticaria and auto-immune diseases.

According to a further feature of the invention, therefore, there is provided a pharmaceutical composition comprising a compound of formula I, or a derivative thereof preferably in the form of a salt, in association with a pharmaceutically acceptable carrier or diluent. There is also provided a process for the manufacture of such a pharmaceutical composition which comprises mixing a compound of formula I with a carrier or diluent.

The nature of the composition and the pharmaceutically acceptable carrier or diluent will, of course, depend upon the desired mode of administration, which may be for example, orally; by inhalation; parenterally; or by topical application. The compositions of the invention generally comprise a minor, but pharmaceutically effective, proportion of the compound of formula I and a major proportion of a carrier or diluent. Thus, for example, solutions for administration by means of a conventional nebulizer will comprise a dilute aqueous solution, which may contain up to about 10 percent by weight of the active ingredient in sterile water; and compositions comprising suspensions or solutions in liquified propellants for dispensing from a pressurized container will contain, for example, about 0.2 – 5 percent by weight of the active ingredient.

The composition may be formulated in the conventional manner with the customary ingredients. For example, the compositions may be put up as aqueous solutions or suspensions, as powders or in tablet, cream, lotion or syrup form.

The compounds of formula I find especial use when inhaled by the user, notably in the treatment of allergic asthma. For such use, the compounds of formula I, preferably in the form of a salt, such as the sodium salt, are dissolved or suspended in water and may be applied by means of a conventional nebulizer. dispenser, the administration of medicaments by means of a pressurized dispensing container, i.e. an aerosol dispenser, is an alternative to nebulizer administration. For administration from an aerosol dispernser, the medicament is dissolved or suspended in a liquefied propellant medium. The propellants for present use may be any of those which are conventionally used in formulations for dispensing from pressurized containers. For example, they may be of the halogenated hydrocarbon type, such as fluoro- or fluorohalohydrocarbons, e.g. trichloromonofluoromethane, dichlorodifluoromethane, dichlorotetrafluoroethane, monochlorotrifluoromethane, monochlorodifluoromethane and mixtures of any of these together or with other propellants. Typical suitable propellants are those disclosed in, for example, U.S Pat. No. 2,868,691 and sold under the trade name of Freon. It is preferred that the propellant should be of low toxicity, especially where the composition is to be ingested, e.g. inhaled, by the user. It is therefore preferred to use difluorodichloromethane, dichlorotetrafluoroethane or mixtures thereof. Where the medicament is not soluble in the propellant, it may be necessary to add a surface-active agent to the composition in order to suspend the medicament in the propellant medium, and such surface-active agents may be any of those commonly used for this purpose, such as non-ionic surface-active agents. However, we prefer to use the anionic dialkyl sulphosuccinate or alkyl benzene sulphonate surface-active agents. The use of such surface-active agents and the advantages which stem therefrom are more fully described in British Patent Specification No. 1,063,512.

The compositions of the invention may also be administered in the form of powders by means of an insufflator device, such as that described in British Patent Specification No. 1,122,284. In order to improve the properties of the powder, it may be desired to modify the surface characteristics of the powder particles, for example, by coating them with a pharmaceutically acceptable material such as sodium stearate. In addition, fine particle sized powders of the active ingredients may be mixed with a coarser diluent material such as lactose which may be present in smaller, equal or greater amount than the active ingredients, for example, in from 50 to 150 percent by weight of the compound of formula I and such other active ingredients as may be present.

Whilst the inhalation of medicament has been described above with particular reference to oral administration, it will be appreciated that it may be desirable to administer the medicament nasally. The term inhalation is therefore used herein to denote, where the context permits, both oral and nasal administration.

The composition of the invention may also be administered as tablets, syrups and the like or by intradermal or intravenous injection in the conventional manner.

In addition to the internal administration, the compounds of formula I may find use in compositions for topical application, e.g. as creams, lotions or pastes for use in dermatological treatments.

In addition to the compound of formula I and the ingredients required to present the compound in a form suitable for the selected mode of administration, other active ingredients may be present in the composition of the invention. Thus, in compositions for administration by inhalation, it may be beneficial to include a bronchodilator. Any bronchodilator may, within reason, be used. Suitable bronchodilators include isoprenaline, adrenaline, orciprenaline, isoetharine and derivatives thereof, particularly the salts thereof. The use of isoprenaline sulphate is preferred. The amount of bronchodilator used will vary over a broad range, depending, inter alia, upon the nature and activity of the bronchodilator and the compound of formula I used. However, the use of a minor proportion (i.e. less than 50 percent by weight) of the bronchodilator is preferred. The use of from 0.1 to 10 percent by weight of the bronchodilator based on the weight of the compound of formula I is particularly preferred.

From a further aspect, the invention therefore provides a composition which comprises a compound of formula I or a derivative thereof in admixture with a bronchodilator, which latter is preferably present in less than 50 percent, especially 0.1 to 10 percent by weight of the former.

As indicated above, the compounds of formula I may be used to inhibit the effects of antibody-antigen reactions and are of especial use in the prophylactic treatment of allergic airway diseases. In such treatment the compound or composition of the invention is administered by the chosen method to the site of the antibody-antigen reaction in the therapeutically effective amount. The treatment may be one which requires repeated dosages of the medicament at regular intervals. The amount and frequency of medicament administered will depend upon many factors and no concise dosage rate or regimen can be generally stated. However, as a general guide where the compounds are administered by inhalation to a patient suffering from acute allergic asthma, therapeutically useful results may be achieved when the compounds are administered at a dosage rate of 0.1 to 50 mgs. Where the compounds are administered by the oral route, larger dosages may be given.

The invention thus also provides a method for inhibiting the effects of an antibody-antigen reaction which comprises the prior application to the known or expected area of the antibody-antigen reaction mechanism of a therapeutically effective amount of a compound of formula I or a derivative thereof.

The compounds of formula I may be prepared by a variety of methods. These will usually involve the steps of introducing the substituents P, Q, R, $P_1$, $Q_1$ and $R_1$, the formation of the pyrone rings on each 'half' of the molecule and the linkage of the two 'halves' of the molecule. These steps may take place in any order where the nature of the reaction conditions and the reactants permits. Thus, some but not all of the substituents may be introduced into each of the benzene rings; these benzene rings may then be converted to chromone nuclei; these chromone nuclei then linked; and finally the last of the substituents introduced.

It will be appreciated that the compounds of formula I possess two pyrone rings and that these may be the same or different. Each of these rings may be introduced in separate stages by different or similar methods or may be introduced together in a single reaction stage. It is also possible to introduce in separate stages a precursor of one of the desired rings, for example, a chain $-CO-CH_2-CH(COOH)-O-$, by one method, to introduce the same or another precursor for the other ring, e.g. a chain $-COCH(CH_3)-CH(COOH)-O-$, by a different method; and then to convert the two precursors into the desired rings in a final common reaction stage, e.g. dehydrogenation. For convenience the preparation of the compounds of formula I will be described in terms of the formation of only one of the two desired pyrone rings. The other ring may be present initially, be formed during the formation of the first ring, or be introduced later by the same or a different process. Where both rings are to be introduced one after another it may be necessary to shield or block the sites at which the second ring is to be introduced. Such shielding or blocking may be achieved by conventional methods.

Furthermore, the two chromone nuclei may each be formed before or after the linkage of the two benzene rings has been effected. Thus, one chromone nucleus may be formed, this then linked to an appropriately substituted benzene ring which is thereafter converted into the second chromone nucleus. However, it is generally preferred that linkage of the two benzene rings be carried out before either of the chromone rings are formed.

The starting materials for present use may therefore be denoted by the general formula:

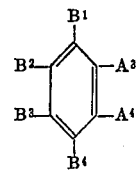

II wherein one of $B^1$-$B^4$ is a group $L^3$ and the others of $B^1$-$B^4$ are P, Q, and R groups as defined above or precursors therefor; the pair of groups $A^3$ and $A^4$ either together represent the desired $-CO-CH=C(COOH)-O-$ chain or a derivative thereof, or represents a pair of groups $A^1$ and $A^2$ which represents a chain or pair of groups (one of which may be hydrogen) convertible either directly or via another chain or pair of groups to the desired $-CO-CH=C(COOH)-O-$ chain or a derivative thereof; and $-L^3$ is either the group:

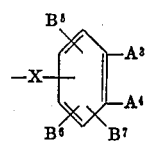

or is a group $-L^4$, or a precursor thereof, capable of reacting with a group $L^5$ in a compound:

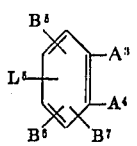

to form the desired $-X-$ linkage group, $B^{5-7}$ being P, Q, and R, groups as defined above or precursors therefor, and X and $A^3$ and $A^4$ have the values given above.

The methods for preparing the compounds of formula I may be generally defined as comprising conversion of such groups A¹ and A² as may be present in a starting material of formula II into the desired CO—CH=C(COOH)—O— chain or a derivative thereof and conversion of such L³ group to the desired:

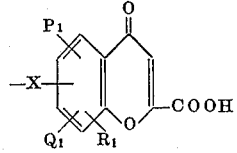

group or derivative thereof. Where the compound II is not a linked compound, i.e. when L³ is an L⁴ group, the process for preparing the compounds of formula I will involve at some stage the reaction of a compound of formula:

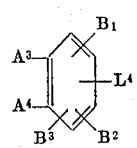

with a compound of formula

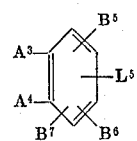

with conversion of either or both pairs of groups A³ and A⁴ (if these are the pairs of groups A¹ and A²) to the desired —CO—CH=C(COOH)—O— chain or a derivative thereof.

For convenience, the linkage and pyrone ring formation will be described herein as separate processes, although it will be understood that this separation is arbitrary and that it is possible to carry out part of the formation of either or both pyrone rings, then to effect linkage and thereafter to complete ring formation.

It will be appreciated that precursors of the above compounds, that is compounds which react under the conditions of the reaction as the above compounds, may be used. Thus, for example, an acetoxy derivative of a phenolic hydroxy group in a compound may be used in place of the free hydroxy group. It is to be understood that in the following processes for preparing the compounds of formula I active precursors may also be used where appropriate.

The conversion of a pair of groups A¹ and A² in a starting material of formula II may be achieved in a number of ways. Thus, the desired pyrone ring may be formed by cyclizing compounds of the general formula:

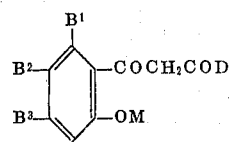

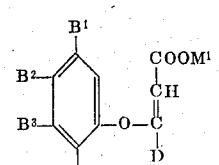

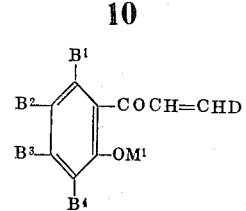

or by modification of a compound carrying an already formed pyrone or pyranone ring, i.e. of compounds of the formulas:

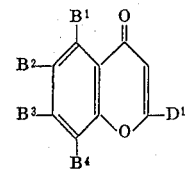

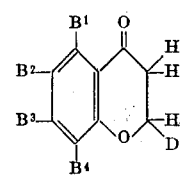

D being a COOM or a group D¹ which is convertible to a COOM group; M¹ being hydrogen or an alkali-metal (e.g. sodium) cation; M being an M¹ group or an alkyl (e.g. lower alkyl) group; and B¹, B², B³ and B⁴ having the values given above.

As indicated above the benzene rings in the above starting materials may carry one or more removable blocking or shielding groups; and reactive groups such as the phenolic OM group may be in the form of an active precursor therefore, e.g. as an acetyloxy group.

The cyclization of the compounds V may be achieved by heating, optionally in the presence of a solvent such as ethanol or glycerol. It is preferred to carry out cyclization in the presence of an acid, such as concentrated aqueous hydrochloric acid, and in an organic solvent such as ethanol. The compounds of formula V may be prepared by reaction of a compound of formula:

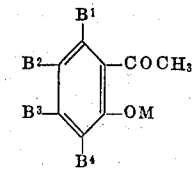

with a compound

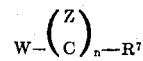

wherein R⁷ is a group reactive with a hydrogen atom in the —COCH₃ group; n is 1 or 2 and, when n is 1, W is a D group as defined above and Z is a carbonyl oxygen and, when n is 2, W is an R⁸ group which is an OH group or a group convertible thereto; and each Z is a carbonyl oxygen or one may represent two halogen atoms. Suitable compounds to be reacted with compound X include dialkyl oxalates such as diethyl or dibutyl oxalate, oxamides such as ethyl oxamate, ethyl oxalylanilide and the like, in which cases the reaction is carried out using the conditions and type of condensation agent used in a Claisen condensation; oxalyl mono- or di-halides such as ethoxalyl chloride or oxalyl chloride, in which case the reaction is carried out in the presence of an acid-binding agent and the intermediate product rearranged to the compound V by means of a Baker Venkataraman rearrangement; or α-dihalo carboxy acids, such as ethyl ethoxy dichloroacetate, in which case the reaction may be carried out in the presence of a finely divided platinum group metal as catalyst.

The compounds of formula VI may be cyclized by treatment with a dehydrating agent, such as sulphuric acid, chlorosulphonic acid or polyphosphoric acid or by conversion of a carboxylic acid group into an acid chloride and then performing an internal Friedel Crafts reaction. The compounds of formula VI may be obtained by reacting a phenol of formula:

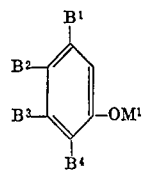

XI with an acid or ester of the formula:

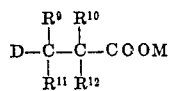

where $R^9$ and $R^{10}$ together form a carbon to carbon bond, or in the alternative, $R^9$ is halogen and $R^{10}$ is hydrogen when $R^{11}$ and $R^{12}$ together form a carbon to carbon bond; or $R^9$ is halogen, $R^{10}$ is hydrogen and one of $R^{11}$ and $R^{12}$ is halogen and the other hydrogen, D and M having the values given above, e.g. an acetylene mono- or dicarboxylic acid or ester or precursor thereof. The reaction is carried out in the presence of a base, which may be the alkali-metal salt of the phenol and may be present in less than 100 molar percent, e.g. 5 to 20 molar percent, based on the phenol. Where the phenol is reacted with an acid or ester containing one or two halogen atoms, e.g. an halofumarate or dihalosuccinate, the reaction is carried out in the presence of an acid-binding agent which may be provided in part by an alkali-metal salt of the phenol.

The compounds of formula VII may be cyclized by treatment with a base in a suitable solvent. Where cyclization is not carried out under oxidizing conditions, a pyranone ring compound of formula IX may be produced which may be converted to the desired compound of formula I as described later. Alternatively simultaneous cyclization and oxidation to yield the pyrone ring compound may be achieved by the use of an oxidizing agent, e.g. selenium dioxide, during the cyclization. The compounds of formula VII may be prepared by the reaction of a compound X and a compound DCHO, wherein D is as defined above, such as glyoxalic acid or cinnamaldehyde, in the presence of a base, such as aqueous NaOH. Alternatively, a phenol of formula XI may be reacted with maleic anhydride in the presence of a Lewis acid and the complex so produced decomposed with a dilute mineral acid.

The pyranone ring compounds of formula IX may be converted to the desired pyrong compound by oxidation or dehydrogenation which may occur directly using, e.g. selenium dioxide or chloranil, or may occur indirectly by means of halogenation, e.g. bromination, and then dehydrohalogenation. The pyranone ring compounds themselves may be produced during the cyclization of the compounds of formula VII or by the reaction of a phenol of formula XI either with a β-substituted-β-chloropropionic acid or derivative thereof or with a β-substituted acrylonitrile.

As indicated above the group D may be a group $D^1$ which is convertible to a COOH group. The $D^1$ group may be one which is hydrolysable to a COOH group, e.g. a —CN or amide group; or may be a group oxidizable to a COOH group, e.g. an alkyl (e.g. lower alkyl) or substituted alkyl (e.g. substituted lower alkyl) group, an aralkenyl (e.g. phenyl lower alkenyl) group or an aldehyde group. These groups may be converted using standard techniques, if desired via another form of $D^1$ group; e.g. a methyl group may be converted to an halo-methyl group which is then oxidized to a COOH group. The compounds of formulas V to VII and IX having D as $D^1$ may be produced by the methods outlined above. The pyrone ring compounds of formula VIII may be produced from these intermediates by the cyclization and conversion methods outlined above; or by a number of other methods, e.g. by the reaction of a compound of formula X with sodium cinnamate and cinnamic anhydride using a Kostanecki Robinson synthesis.

In addition to the above methods for forming the desired pyrone ring in a starting material, other routes may be readily devised. Thus, a phenol of formula XI may be reacted with a mono-halo oxalyl ester to give a compound:

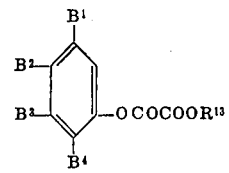

wherein $R^{13}$ is an alkyl (e.g. lower) or alkaryl (e.g. phenyl lower alkyl) group, which compound may then be condensed with an acetyl halide (e.g. acetyl chloride or bromide), acetic anhydride or acetic acid in the presence of a Lewis acid.

As indicated above, the pair of groups $A^1$ and $A^2$ in a starting material may form a chain which may be converted into a pair of groups from which the desired —CO—CH=C(COOH)—O— chain may be derived. Thus, $A^1$ and $A^2$ may together form a chain —O—CO—CH=CR$^{14}$— [where $R^{14}$ is an alkyl (e.g. lower alkyl) or aryl (e.g. phenyl) group] which may be cleaved with an alkali or hydrazine to give a compound where $A^2$ is hydrogen and $A^1$ is an $OM^1$ group or a derivative thereof.

From the above examples of the conversion of the groups $A^1$ and $A^2$ into the desired —CO—CH=C(COOH)—O— chain or a derivative thereof, it will be seen that many of these routes may be together broadly described as the conversion of compounds wherein $A^1$ and $A^2$ form the pairs of groups —OM and —H or —COJ; —H and —OCD=CH COOM; —OCOCOOR$^{13}$ and —H or —COCH$_3$ respectively [wherein J is a group —CH$_3$, —OM, —CH$^3$ COD or —CH=CHD, and $R^{13}$, D and M have the values given above] or wherein $A^1$ and $A^2$ together form a chain —CO—CH=C(D$^1$)O—, —CO—CH$_2$—CH(D)O— or —O—CO—CH=CT$^2$ [$T^2$ being an alkyl (e.g. lower alkyl such as methyl or ethyl) or aryl (e.g. phenyl) group].

The processes outlined above may produce the free acids of formula I or may yield derivatives thereof. It is also within the scope of the present invention to treat the product of any of the above processes, after any isolation and purification steps that may be desired, in order to liberate the free acid therefrom or to convert one form of derivative into another. The methods used to isolate and purify any product may be those conventionally used. Thus, salts may be prepared by the use of alkaline conditions during the recovery and purification of the compound. Alternatively, the free acid may be obtained and subsequently converted to a desired salt by neutralization with an appropriate base, e.g. an organic amine, or an alkali such as an alkali-metal or alkaline-earth metal hydroxide, carbonate or bicarbonate, preferably a mild base or alkali such as sodium carbonate or bicarbonate. Where the compound is recovered in the form of a salt, this salt may be converted to a more desirable salt, for example, by a metathetical process. The esters may be obtained as a result of having used appropriate starting materials, for example, by the reaction of a dialkyl (e.g. di-lower alkyl) oxalate with a compound of formula X as hereinbefore described; may be formed by the reaction of an appropriate alcohol, alkyl (e.g. lower alkyl) sulphate or halo- (e.g. chloride or bromide) compound with free carboxyl groups in the compound I; or may be formed by the reaction of an appropriate alcohol with an acyl halide (e.g. lower acyl chloride or bromide) of the compound of formula I. Alternatively, transesterification techniques may be used to exchange one ester group for another. The amides may be readily obtained, for example, by dehydration of the ammonium salt or by reaction of an ester or acyl halide (e.g. a lower acyl chloride or bromide with an appropriate amino compound such as ammonium hydroxide or a primary or secondary amine or an amino acid. Alternatively the free acid of formula I may be condensed with an alkyl (e.g. lower alkyl) haloformate (e.g. chloroformate) in the presence of an organic base such as triethylamine, to yield a mixed anhydride which is then treated with an amino-acid or ester thereof in the presence of a suitable solvent to give an N-carboxyalkyl substituted amide. The mixed anhydride need not be isolated from the reaction mixture in which it was prepared, but may be treated in situ.

As indicated above, the general formula II for the starting material is intended to relate not only to compounds containing only one benzene ring but also to compounds which already possess the two rings linked by an —X— linkage. Where the starting material is not already linked, such linkage may be achieved by a variety of methods depending upon the nature of the — X— linkage, at any suitable pint during the production of the compounds of the invention. Moreover, the linkage group or atom —X— may be introduced into one molecule of the starting material which is then treated to convert the $A^1$ and $A^2$ groups partially or wholly to the desired —CO—CH=C(COOH)—O— chain and a further molecule of starting material or a chromone nucleus then attached to the free end of the linkage atom or group —X—. For convenience, the methods of forming the —X— linkage will be described in terms of linking two molecules of the same starting materials II through the $B^2$ positions in a single process, i.e. by reacting the compounds III and IV referred to earlier. It will be understood that in many cases the initial linkage produced may be a precursor of the desired linkage, as when substituents are to be present upon the desired final linkage. The intermediate linkage may be converted to the desired form using the appropriate conventional techniques.

The linkage of the compounds of formulas III and IV may be achieved by a variety of methods depending upon the nature of the linkage which it is desired to produce and may take place as an initial, intermediate or final step in an overall linkage process. The compounds of formulas III and IV may therefore exist only as transitory intermediates in a multistage process. For convenience, the linkage group —X— will be denoted by —$L^1LL^2$— — ($L^1$ and $L^2$ being methylene or substituted methylene groups and L being a linking atom or chain or a single or double bond or an atom or group which forms a carbocyclic or heterocyclic ring with the groups $L^1$ and $L^2$) in order that the attachment ($L^1$ or $L^2$) between the benzene ring and the rest of the linkage —L— may be readily identified.

The linkage reaction takes place when a molecule of a starting material:

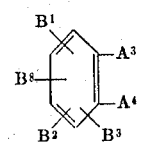

is reacted with a compound $B^8L^6B^9$ (wherein $B^8$ and $B^9$ are groups or functions capable of reacting together to form the desired —$L^1$— or —$L^2$— linkages and —$L^6$— is either an —L— group or, with the residues of both pairs of groups $B^8$ and $B^9$ groups, forms an —$L^1LL^2$— group) to form a compound of formula:

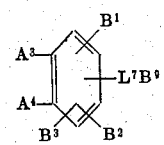

wherein $L^7$ is the group formed by the $L^6$ group and the residues, if any, of one pair of groups $B^8$ and $B^9$ (which corresponds to the compound of formula III) which may then be reacted with a compound of the formula:

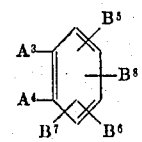

(corresponding to the compound of formula IV) to yield a product containing the desired linkage —$L^1LL^2$—. These reactions may take place in an apparently single stage reaction when the compounds to be linked are the same; or may take place in two or more separate steps when the units to be linked are different or where the $L^1$ and $L^2$ groups are different. It will be appreciated that the groups $L^4$ and $L^5$ in the compounds for formulas III and IV may have been introduced in one or more earlier stages of a multistage linking process. The use of a multistage linking process is of especial application where the linkage group —L— carries substituents such as secondary OH groups or has interruptions in the chain thereof such as ether or ester linkages. Such substituents or interruptions may be introduced during the progressive build-up of the L⁴ and L⁵ groups on each benzene ring or when L⁴ and L⁵ are reacted together to form the desired overall —L¹LL²— group or a precursor therefor.

The desired linkages may be formed in a variety of manners using conventional techniques.

For the purposes of forming the linkage between the —L— group and the benzene ring, linkages through methylene or substituted methylene groups (such as carbonyl groups) and carbocyclic or heterocyclic rings may be considered as forming part of the —L— group. Such linkages may be achieved using conventional techniques for forming carbon to carbon bonds, e.g. by means of a Friedel Crafts reaction using an alkyl halide or acyl halide, by means of a Hoesch reaction on an alkyl nitrile, or by reacting a benzaldehyde with a dialkyl ketone, e.g. acetone, to give a linkage —CH=CHR—CORCH=CH— wherein —RCH= is the residue of the group —RCH₃ in the reactant ketone H₃CRCORCH₃.

Where the linkage between the —L— group and the benzene ring is through a carbonyl group or a secondary or tertiary hydroxy methylene group, such linkages may also be obtained by the use of an appropriate Grignard reaction between an aryl magnesium halide and a compound B⁹L⁶B⁹ having B⁹ as an aldehyde, carbonyl, ester or cyanide group. The carbonyloxy and carbonyl amino linkage may be formed using any of the conventional methods.

As indicated above, it is within the scope of the present invention to build up the L⁴ and L⁵ groups in compounds III and IV from their constituent parts in a series of stages, and as a last stage to react the resultant compounds of formulas III and IV to obtain the overall —L¹LL²— linkage. During such progressive build-up of the groups L⁴ and L⁵, each successive portion of the desired group is attached to an existing portion by the reaction of compounds carrying the appropriate reactive groups using the conventional methods. Usually the portion which is to be introduced will carry two reactive groups, one to attach it to the existing portion, the other to enable further portions to be attached subsequently or to act as the reactive group on the L⁴ group for reaction with the L⁵ group. This second reactive group on a portion of the linkage being introduced may be blocked or shielded so as not to interfere with the reaction of the other reactive group. Alternatively, the second reactive group may be introduced after reaction of the first group has taken place.

Where the —L— group is to be a hydrocarbon chain, this may be built up progressively using the methods outlined above for forming the linkages L¹ and L² between the —L— group and the benzene rings. Where —L— is a chain which is interrupted by hetero-atoms such as oxygen or nitrogen, these interruptions may be formed using conventional techniques.

Many of the intermediates used in the preparation of the compounds of formula I are themselves novel and the invention therefore also provides these intermediate compounds of the formula:

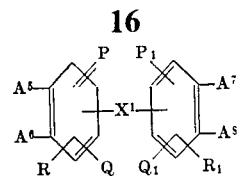

and derivatives thereof (e.g. the salt, ester and amide) wherein the pair of groups A⁵ and A⁶ forms the pair of groups A¹ and A² or blocked or shielded precursors therefor; the pair of groups A⁷ and A⁸ forms a chain —CO—CH=C(COOH)—O— or a derivative thereof or forms a pair of groups A⁵ and A⁶ as defined above; X¹ is an X group or a blocked or shielded precursor thereof; and A¹, A², X, P, Q, R, P₁, Q₁ and R₁ have the values given above.

The invention will now be illustrated by the following Examples in which all parts and percentages are by weight unless otherwise stated.

EXAMPLE 1

1,5-Bis(2-carboxychromon-6-yl)pentane a. 4-(4-Methoxybenzoyl)butyric acid

A solution of 108 parts of anisole and 119.7 parts of glutaric anhydride in 1000 parts of tetrachloroethane and 250 parts of nitrobenzene was cooled below 5°C and 279 parts of anhydrous aluminum chloride added to it at such a rate as to keep the temperature of the mixture below 5°C. The mixture was stored with occasional shaking for 2½ days and then poured into 4000 parts of crushed ice and 100 parts of concentrated hydrochloric acid. The steam-volatile components were removed by steam-distillation and the solid residues filtered off from the cooled solution. The solid material was dissolved in ether, and the etherial solution charcoaled before it was extracted with 10 percent sodium hydroxide solution. The alkaline extracts were charcoaled and then acidified with 10 percent hydrochloric acid. The cream precipitate was filtered off and dried at the vacuum pump to give 140 parts of 4-(4-methoxybenzoyl)butyric acid m.p. 138°–140°C.

b. 5-(4-Methoxyphenyl)valeric acid

A mixture of 140 parts of 4-(4-methoxybenzoyl)butyric acid, 360 parts of amalgamated zinc, 600 parts of dioxan, 300 parts of toluene, and 500 parts of concentrated hydrochloric acid was refluxed for 24 hours, during which time an additional 100 parts of hydrochloric acid was added every 6 hours. The mixture was then cooled, extracted with ether, and the extracts evaporated to give 129 parts of an oil. The oil was dissolved in 10 percent sodium hydroxide solution, the solution extracted with ether, and the alkaline solution then acidified to give a white precipitate. This was filtered off and dried at the pump to give 98 parts of 5-(4-methoxyphenyl)valeric acid, m.p. 91°–93°C.

c. 1,5-Bis(4-methoxyphenyl)pentane

A solution of 98 parts of 5-(4-methoxyphenyl)valeric acid in 100 parts of benzene was refluxed with 150 parts of thionyl chloride for 2 hours. The mixture was then evaporated to give 91 parts of a black oil which solidified on cooling. This crude acid chloride was dissolved in 1000 parts of tetrachloroethane and 48 parts of anisole added to the solution which was cooled to 0°–5°C. The temperature was kept below 5°C during the addition of 60 parts of anhydrous aluminum chloride. The mixture was stirred for 24 hours at room temperature and then poured into 2000 parts of crushed ice to which had been added 50 parts of concentrated hydrochloric acid. The solution was steam distilled and the non-volatile oil taken up in ether and washed with sodium hydrogen carbonate solution until acid material had been removed. The etherial solution was then dried over anhydrous sodium sulphate, charcoaled, and the solvent evaporated to give 45 parts of a brown oil which solidified on cooling to give 1,5-bis(4-methoxyphenyl)pentan-1-one which was not purified but refluxed for 24 hours with 100 parts of amalgamated zinc in 350 parts of dioxan, 250 parts of concentrated hydrochloric acid and 150 parts of water. During this time two further portions of 50 parts of concentrated hydrochloric acid were added. The resulting mixture was cooled, extracted with ether and the extracts evaporated to give an oil. The oil was again taken up in ether, and the extracts washed with potassium carbonate solution, dried and charcoaled to give an oil which was distilled in vacuo. The fraction b.p. 180–185/0.2cmm was collected to give 25 parts of 1,5-Bis(4-methoxyphenyl)pentane.

Analysis:
 Found: C, 80.7; H, 8.65%
 $C_{19}H_{24}O_2$ requires: C, 80.24; H, 8.51% d. 1,5-Bis(4-hydroxyphenyl)pentane

A solution of 13 parts of 1,5-Bis(4-methoxyphenyl)pentane in 50 parts of glacial acetic acid was refluxed for 1 hour with 80 parts of hydrogen bromide in acetic acid. The dark solution was evaporated to half bulk, diluted with an equal volume of water and evaporated to give an oil. The oil was taken up in ether, the etherial solution washed with 10% aqueous sodium hydroxide and the alkaline extracts saturated with carbon dioxide. The phenolic precipitate was taken up in ether, the extracts dried and evaporated, and the resultant oil crystallized from 60/80 petroleum ether to give 9 parts of 1,5-bis(4-hydroxyphenyl) pentane as fine needles m.p. 99°–101°.

Analysis:
 Found: C, 79.5; H, 7.48%
 $C_{17}H_{20}O_2$ requires: C, 79.65; H, 7.86% e. 1,5-Bis(2-carboxychromon-6-yl) pentane

To a stirred solution of sodium ethoxide, prepared from 0.46 parts of sodium and 20 parts of ethanol, were added 2.5 parts of 1,5-di(o-hydroxyphenyl) pentane. The solution was then evaporated leaving the sodium salt of the phenol as a white solid. This was suspended in 50 parts of refluxing dry dioxan and to it were added 4.13 parts of ethyl chlorofumarate. Refluxing was continued for 1 hour, after which 20 parts of 10 percent sodium hydroxide solution were added and refluxing continued for a further 1 hour. The dioxan was evaporated and the residue diluted with water and extracted with ether. The aqueous solution was then acidified with 10 percent hydrochloric acid and extracted with ether. The ethereal extracts were extracted with sodium hydrogen carbonate solution and this aqueous solution was then acidified and extracted with ether. This ethereal solution was evaporated to give 3 parts of a red oil which were triturated for 15 minutes with 20 parts of cold concentrated sulphuric acid to dissolve the oil. The viscous red solution was then poured on to crushed ice to give an oily solid. The supernatant liquors were decanted and the oil was recrystallized from ethanol to give 0.3 parts of 1,5-bis(2-carboxychromon-6-yl) pentane as a white solid m.p. 265°–7°C (with decarboxylation).

Analysis:
 Found: C, 66.4; H, 4.68%
 $C_{25}H_{20}O_8$ requires: C, 66.96; H, 4.50% f. 1,5-Bis(2-ethoxycarbonylchromon-6-yl) pentane

To a solution of 50 parts of ethanol saturated with hydrogen chloride were added 0.6 parts of 1,5-bis(2-carboxychromon-6-yl) pentane and the mixture was refluxed for 2 hours. The acid dissolved slowly and, on cooling the solution, there were obtained 0.45parts of 1,5-bis(2-ethoxycarbonylchromon-6-yl) pentane as white needles m.p. 162°–4°C.

Analysis:
 Found: C, 69.6; H, 5.61%
 $C_{29}H_{28}O_8$ requires: C, 69.04; H, 5.59% g. 1,5-Bis(2-carboxychromon-6-yl) pentane disodium salt

A mixture of 0.45 parts of 1,5-bis(2-ethoxycarbonylchromon-6-yl) pentane and 1.92 parts of 0.9298N sodium hydroxide in ethanol was refluxed for two hours and then evaporated to give a white solid. This was dissolved in 50 parts of water and freeze dried to give 1,5-bis(2-carboxychromon-6-yl) pentane salt as a white powder.

EXAMPLE 2

1,6-Bis(2-carboxychromon-6-yl) hexane a. 1,6-bis(4-methoxyphenyl)hexa-1,6-dione

A mixture of 25.6 parts of anisole, 34.9 parts of anhydrous aluminum chloride, and 50 parts of tetrachloroethane was treated with 21.3 parts of adipoyl chloride over a period of 20 minutes. The temperature of the mixture rose to 40°C and it was stirred for 2 hours at that temperature before being poured into a mixture of 25 parts concentrated hydrochloric acid and 500 parts of crushed ice. The resultant white precipitate was filtered off and recrystallized from alcohol to give 21.5 parts of 1,6-bis(4-methoxyphenyl)hexa-1,6-dione, m.p. 136°C. b. 1,6-Bis(4-methoxyphenyl) hexane A mixture of 20 parts of zinc wool, 2 parts of mercuric chloride, 32 parts of water and 2,4 parts of concentrated hydrochloric acid was shaken for 5 minutes. The liquid was decanted and to the residual amalgamated zinc were added 8.5 parts of water, 26 parts of concentrated hydrochloric acid, 9 parts of toluene and 5 parts of 1,6-bis-(4-methoxyphenyl) hexa-1,6-dione.

The mixture was heated under reflux for 60 hours and a further 13 parts of concentrated hydrochloric acid were added after the first 6 hours. After cooling and separation of the solid residue, the organic layer was separated and the aqueous layer was extracted with ether. The combined toluene and ether solutions were washed, dried and the solvents were removed. The yellow residue was crystallized from petrol to give 3,4 parts of 1,6-bis-(4-methoxyphenyl) hexane, m.p. 70°C.

Analysis:
 Found: C, 81.56; H, 8.7%
 $C_{20}H_{26}O_2$ requires: C, 80.6; H, 8.74%

The structure was confirmed by infra-red and nuclear magnetic resonance spectrometry.

c. 1,6-Bis-(3-acetyl-4-hydroxyphenyl) hexane

A mixture of 29.8 parts of 1,6-bis-(4-methoxyphenyl)hexane and 23.5 parts of acetyl chloride in 80 parts of tetrachloroethane were stirred in an ice-bath and 83 parts of aluminum chloride were added keeping the temperature below 15°C. The mixture was then stirred overnight, steam-distilled to remove the solvent and the product was extracted with ether, dried and the ether was removed. The residual brown oil solidified and was crystallized from petrol to give 15.5 parts of 1,6-bis-(3-acetyl-4-hydroxyphenyl) hexane m.p. 97°–98°C the structure of which was confirmed by analysis and nuclear magnetic resonance spectrometry.

Analysis:
Found: C, 70.0; H, 7.44%
$C_{22}H_{26}O_4$ requires: C, 74.5; H, 7.40% d. 1,6-bis-(2-ethoxycarbonylchromon-6-yl) hexane

A solution of sodium ethoxide was prepared from 5.52 parts of sodium and 90 parts of ethanol. To this was added a mixture of 10.7 parts of 1,6-bis-(3-acetyl-4-hydroxyphenyl) hexane, 21.9 parts of diethyl oxalate and 75 parts of dry ether. The mixture was heated at approximately 40°C. for 3½ hours. After cooling, it was poured into water, acidified and the solution was extracted with ethyl acetate. The extract was washed, dried and the solvent was removed. The residual oil was heated with 135 parts of ethanol and 19.5 parts of concentrated hydrochloric acid for 10 minutes to given, on cooling, a white solid which was filtered off and dried. It was crystallized from ethanol to give 3.2 parts of pure 1,6-bis-(2-ethoxycarbonyl-chromon-6-yl) hexane m.p. 160°C.

Analysis:
Found: C, 69.7; H, 6.17%
$C_{30}H_{30}O_8$ requires: C, 69.4; H, 5.8% e. 1,6-Bis-(2-carboxychromon-6-yl) hexane

A mixture of 1.5 parts of 1,6-bis-(2-ethoxycarbonylchromon-6-yl) hexane and 20 parts of saturated sodium bicarbonate solution was stirred and heated at 100°C overnight. The mixture was cooled and filtered and the filtrate was acidified to give 1,6-(bis-2-carboxychromon-6yl) hexane which, on crystallization from dioxan, gave the pure compound, m.p. 249°–251°C. (decomp).

Analysis:
Found: C, 67.1; H, 4.86%
$C_{26}H_{22}O_8$ requires: C, 67.5; H, 4.76% f. 1,6-Bis-(2carboxychromon-6-yl) hexane disodium salt 0.2 parts of 1,6-bis-(2-carboxychromone-6-yl) hexane were treated with 0.070 parts of sodium bicarbonate in water. The resulting solution was filtered and freeze-dried to give the disodium salt of 1,6-bis-(2-carboxychromon-6-yl) hexane.

EXAMPLE 3

1,3-Bis-(2-carboxychromon-6-yl) propane a. 1,3-Bis(4-methoxyphenyl)propane

A solution of 50 parts of 4,4′-dimethoxychalcone (1,3-bis-(4-methoxyphenyl)2-propan-1-one) in 100 parts of glacial acetic acid was hydrogenated at 60 p.s.i. over palladised charcoal. When the uptake of hydrogen had ceased, the solution was filtered and the filtrate evaporated to give an oil. This was extracted with 60/80 petroleum ether and the extracts evaporated to give 47.5 parts of a clear oil. A solution of 30 parts of this oil was refluxed for 3 days with 100 parts of amalgamated zinc, 200 parts of concentrated hydrochloric acid, 100 parts of water, and 200 parts of dioxan. Further portions of 50 parts of hydrochloric acid were added daily. The reaction products were extracted with ether and the extracts evaporated to give a clear pink oil. This was extracted with 60/80 petroleum ether and the extracts evaporated to give a colorless oil. This was distilled and the fraction b.p. 154–160/0.2 mm collected to give 15 parts of 1,3-bis(4-methoxyphenyl)propane.

Analysis:
Found: C, 79.6; H, 8.07%
$C_{17}H_{20}O_2$ requires: C, 79.7; H, 7.82% b. 1,3-Bis-(3-acetyl-4-hydroxyphenyl) propane

A solution of 20 parts of 1,3-bis-(p-methoxyphenyl) propane and 12.4 parts of acetyl chloride in 500 parts of tetrachloroethane was cooled to below 15°C and stirred during the addition of 54 parts of anhydrous aluminum chloride. The mixture was stirred at room temperature for 18 hours and then warmed to 50°C for 1 hour before being poured on to 1,000 parts of crushed ice and 25 parts of concentrated hydrochloric acid. The tetrachloroethane was removed by steam-distillation and the residue was extracted with ether. The extracts were dried, charcoaled and evaporated to give a solid which on recrystallization from ethanol gave 14 parts of 1,3-bis-(3-acetyl-4-hydroxyphenyl) propane as white plates, m.p. 112°C.

Analysis:
Found: C, 72.88; H, 6.55%
$C_{12}H_{20}O_4$ requires: C, 73.06; H, 6.45% c. 1,3-Bis-(2-ethoxycarbonylchromon-6-yl) propane

To a stirred solution of sodium ethoxide, prepared from 2.95 parts of sodium and 100 parts of ethanol, was added a solution of 5 parts of 1,3-bis(3-acetyl-4-hydroxyphenyl) propane in 11.7 parts of diethyl oxalate and 50 parts of ether. The mixture was heated under reflux for 4 hours, cooled, diluted with ether and extracted with water. The aqueous extracts were acidified with hydrochloric acid and extracted with chloroform. Evaporation of the chloroform extracts gave a red solid which was dissolved in 100 parts of boiling ethanol to which were added 3 parts of concentrated hydrochloric acid. A fawn powder was precipitated which was recrystallized from ethanol (charcoal) to give 1.8 parts of 1,3-bis-(2-ethoxycarbonylchromon-6-yl) propane as needles m.p. 190°–2°C.

Analysis:
Found: C, 67.58; H, 5.11%
$C_{27}H_{24}O_8$ requires: C, 68.06; H, 5.08% d. 1,3-Bis-(2-carboxychromon-6-yl) propane disodium salt

A solution of 1.2 parts of 1,3-bis-(2-ethoxycarbonylchromon-6-yl) propane and 0.424 parts of sodium hydrogen carbonate in 40 parts of ethanol and 20 parts of water was heated and stirred on a steam-bath for 1 hour. The solution was charcoaled, evaporated to remove ethanol and the aqueous solution was freeze-dried to give 1.1 parts of 1,3-bis-(2-carboxychromone-6-yl) propane disodium salt as a white powder.

The structure was confirmed by nuclear magnetic resonance spectroscopy.

EXAMPLE 4

1,5-Bis-(2-carboxychromon-6-yl)pentan-3-ol a. 1,5-Bis(4-methoxyphenyl)pentan-3-ol A solution of 50 parts of Bis(4-methoxybenzylidene) acetone in 100 parts of warm glacial acetic acid was hydrogenated at 60 p.s.i. over palladised charcoal until the uptake of hydrogen ceased. The solution was filtered and the filtrate evaporated to an oil, which was dissolved in 160 parts of ethanol and refluxed overnight with 5 parts of sodium borohydride. The solvent was then reduced to half bulk and diluted with water to give fine needles which were filtered off and dried to give 45 parts of 1,5-bis(4-methoxyphenyl)-pentan-3-ol m.p. 77°–8.
Analysis:
Found: C, 76.7; H, 7.54%
$C_{19}H_{24}O_3$ requires: C, 76.1; H, 8.00% b. 1,5-Bis-(p-methoxyphenyl) pent-3-yl acetate 54.5 parts of 1,5-bis-(p-methoxyphenyl) pentan-3-ol were mixed with 218 parts of acetic anhydride and 0.5 parts concentrated sulphuric acid were added. The mixture was stored for 72 hours at room temperature, poured into 1,000 parts of water and the solution was extracted with ether. The extracts were washed with cold 10 percent sodium hydroxide solution, then with water, dried and evaporated to give 55 parts of a pale yellow oil. The oil was distilled to give 49 parts of 1,5-bis-(p-methoxyphenyl) pent-3-yl acetate as a colorless liquid, b.p. 203°–6°C 0.15 mm.
Analysis:
Found: C, 73.86; H, 7.45%
$C_{21}H_{26}O_4$ requires: C, 73.66; H, 7.66% c. 1,5-Bis-(3-acetyl-4-hydroxyphenyl) pent-3-yl acetate

To a stirred and cooled solution of 23 parts of 1,5-bis-(p-methoxyphenyl) pent-3-yl acetate and 17.4 parts of acetyl chloride in 450 parts of nitrobenzene and 50 parts of tetrachloroethane were added 54 parts of anhydrous aluminum chloride at such a rate as to keep the temperature of the mixture below 15°C. After the addition was complete the mixture was warmed at 50°C. for 3 hours and stored at room temperature for 18 hours before being poured on to 3,000 parts of crushed ice. The mixture was extracted with chloroform and the extracts were steam distilled. The residual oil was taken up in ether, the solution was dried, charcoaled and evaporated to give 22 parts of 1,5-bis-(3-acetyl-4-hydroxyphenyl) pent-3-yl acetate as a colorless oil. The purity was determined by thin layer chromatography and the structure by mass spectrometry.

d. 1,5-Bis-(2-ethoxycarbonylchromon-6-yl) pentan-3-ol

To a stirred solution of sodium ethoxide, prepared from 5.26 parts of sodium and 200 parts of ethanol, was added a solution of 21.9 parts of diethyl oxalate and 10 parts of 1,5-bis-(3-acetyl-4-hydroxyphenyl) pent-3-yl acetate in 150 parts of ether. The mixture was refluxed for three hours following the addition, stored at room temperature for 18 hours and then poured into a chloroform and water mixture. The aqueous layer was separated, acidified with 2N hydrochloric acid and extracted with chloroform. The extracts were dried, charcoaled and evaporated to give an oil that was heated for one hour in 20 parts of ethanol and 1 part of concentrated hydrochloric acid. Evaporation of the ethanol gave 2.15 parts of solid which recrystallized from ethanol to give 1.4 parts of 1,5-bis-(2-ethoxycarbonylchromon-6-yl) pentan-3-ol as a yellow powder, m.p. 172°–5C.
Analysis:
Found: C, 66.9; H, 5.36%
$C_{29}H_{28}O_9$ requires: C, 66.9; H, 5.42% e. 1,5-Bis-(2-carboxychromon-6-yl) pentan-3-ol disodium salt

A solution of 1.374 parts of 1,5-bis-(2-ethoxycarbonylchromon-6-yl) pentan-3-ol in 25 parts of methanol was refluxed with 5.61 parts of 0.941N methanolic sodium hydroxide. After 0.5 hour the solvent was evaporated. The residue was dried by azeotroping with benzene and recrystallized from ethanol to give 1.1 parts of 1,5-bis-(2-carboxychromon-6-yl) pentan-3-ol disodium salt.

f. 1,5-Bis-(2-carboxychromon-6-yl) pentan-3-ol

A solution of 1.9 parts of 1,5-bis-(2-ethoxycarbonylchromon-6-yl) pentan-3-ol in 50 parts of ethanol was refluxed for one hour with one part of sodium hydrogen carbonate in 30 parts of water. The ethanol was evaporated and the aqueous solution was acidified with 2N hydrochloric acid to give 1.4 parts of 1,5-bis-(2-carboxychromon-6-yl) pentan-3-ol as a cream powder, m.p. 240°C. (with decarboxylation).

EXAMPLE 5

1,5-Bis-(2-carboxychromon-6-yl) pent-2-ene a. 1,5-Bis-(3-acetyl-4-hydroxyphenyl) pentan-3-ol 14 parts of 1,5-bis-(3-acetyl-4-hydroxyphenyl) pent-3-yl acetate were warmed with 20 parts of 10 percent sodium hydroxide solution for 1 hour. The ethanol was evaporated and the aqueous residue was acidified with 10 percent hydrochloric acid to give an oil which was taken up in ether, dried, charcoaled and the solvent evaporated to give 10 parts of 1,5-bis-(3-acetyl-4-hydroxyphenyl) pentan-3-ol as a low melting solid. Its structure was confirmed by mass spectrometry.

b. 1,5-Bis-(3-acetyl-4-hydroxyphenyl) pent-2-ene

A mixture of 30 parts of potassium hydrogen sulphate and 10 parts of 1,5-bis-(3-acetyl-4-hydroxyphenyl) pentan-3ol was heated at 200°C. for 1 hour. The resulting tar was partitioned between water and chloroform, the chloroform layer separated, dried, charcoaled and evaporated to give a dark oil. This was extracted with petroleum ether and the extracts were evaporated to give 1,5-bis-(3-acetyl-4-hydroxyphenyl) pent-2-ene as a colorless oil.
Analysis:
Found: C, 74.7; H, 6.82%
$C_{21}H_{22}O_4$ requires: C, 74.5; H, 6.55% c. 1,5-Bis-(2-carboxychromon-6-yl) pent-2-ene

To a solution of sodium ethoxide, prepared from 1.19 parts of sodium in 75 parts of ethanol, was added with stirring a solution of 2.2 parts of 1,5-bis-(3-acetyl-4-hydroxyphenyl) pent-2-ene and 4.75 parts of diethyl oxalate in 30 parts of ether. The mixture was refluxed gently for 2 hours, stored at room temperature for 18 hours and then added to a mixture of 100 parts of water and 100 parts of ether. The aqueous layer was separated, acidified with 10 percent hydrochloric acid and extracted with chloroform. The extracts were dried, charcoaled and evaporated to give an oil, which was warmed with a solution of 1 part of sodium hydrogen carbonate in 25 parts of water and 25 parts of ethanol until clear. The ethanol was evaporated and the aqueous solution acidified to give a gum which was crystallized from a chloroform-petroleum ether mixture to give 0.5 parts of 1,5-bis-(2-carboxychromon-6-yl) pent-2-ene as a yellow powder, m.p. 178°–80°C.
Analysis:
Found: C, 64.2; H, 4.38%
$C_{25}H_{18}O_8 \cdot H_2O$ requires: C, 64.7; H, 4.32% d. 1,5-Bis-(2-carboxychromon-6-yl) pent-2-ene disodium salt

To a solution of 0.145 parts of sodium hydrogen carbonate in 5 parts of water were added 0.385 parts of 1,5-bis-(2-carboxychromon-6-yl) pent-2-ene and the mixture was warmed until homogeneous. The solution was then charcoaled, filtered and the filtrate was freeze-dried to give 0.350 parts of 1,5-bis-(2-carboxychromon-6-yl) pent-2-ene disodium salt as a fine white powder.

EXAMPLE 6

1,5-Bis(2-carboxychromon-8-yl-pentane a. 1,5-Di(o-methoxyphenyl)penta-1,4-dien-3-one A mixture of 90 parts of o-methoxybenzaldehyde, 19.3 parts of acetone and 250 parts of ethanol were stirred at below 15°C during the addition of 266 parts of 10 percent sodium hydroxide solution over 1 hour. The mixture was then stored at 0°C for 18 hours and solid material filtered off and washed with petroleum (b.pt. 40°–60°C) to give yellow plates. These were recrystallized from ethanol to give 58 parts of 1,5-di(o-methoxyphenyl)penta-1,4-dien-3-one, m.p. 125°–7°C.
Analysis:
Found: C, 76.8; H, 6.06%
$C_{19}H_{18}O_3$ requires: C, 77.5; H, 6.16% b. 1,5-Di(o-methoxyphenyl)pentan-3-one

A solution of 72 parts of 1,5-di(o-methoxyphenyl)penta-1,4-dien-3-one in 500 parts of ethyl acetate was hydrogenated at 60 pounds per square inch pressure and 50°C using 3 parts of palladium on charcoal as catalyst. When the uptake of hydrogen ceased the solution was filtered and evaporated to give an oil. Recrystallization from petroleum (b.pt. 60°–80°C) gave 1,5-di(o-methoxyphenyl)pentan-3-one as rhombic plates, m.p. 89°–90°C.
Analysis:
Found: C, 76.4; H, 7.56%
$C_{19}H_{22}O_3$ requires: C, 76.5; H, 7.43% c. 1,5-Di(o-methoxyphenyl) pentane

A mixture of 100 parts of amalgamated zinc, 150 parts of dioxan, 100 parts of water, 150 parts of concentrated hydrochloric acid and 26 parts of 1,5-di(o-methoxyphenyl)pentan-3-one was refluxed for 18 hours. The cooled reaction products were decanted from the zinc, extracted with ether, and the extracts dried and evaporated to give an oil. The oil was extracted with petroleum (b.pt. 40°–60°C) and these extracts were evaporated to give an oil which was distilled to give 24 parts 1,5-di(o-methoxyphenyl)pentane as a colorless oil, b.p. 160°–151°C 0.4 mm.
Analysis:
Found: C, 80.5; H, 8.24%
$C_{19}H_{24}O_2$ requires: C, 80.2; H, 8.51% d. 1,5-Di(o-hydroxyphenyl)pentane

A solution of 15 parts of 1,5-di(o-hydroxyphenyl)pentane in 50 parts of glacial acetic acid was heated under reflux with 80 parts of 45 percent w/v hydrogen bromide in acetic acid for 1.5 hours. The mixture was then evaporated to half bulk, poured into water and extracted with ether. The extracts were washed with sodium hydrogen carbonate solution and then water, dried, charcoaled and evaporated to give 12 parts of a brown oil. This oil was extracted with petroleum (b.pt. 40°–60°C). Evaporation of the extracts gave 8.5 parts of oil which were recrystallized from petroleum (b.pt. 40°–60°C) to give 8 parts of 1,5-di(o-hydroxyphenyl)pentane as qhite needles, m.p. 84°–6°C.

e. 1,5-Bis-(2-carboxychromon-8-yl)pentane

A solution of sodium ethoxide was prepared from 1.79 parts of sodium and 200 parts of ethanol. To it were added 10 parts of 1,5-di(o-hydroxyphenyl)pentane and the mixture evaporated to dryness. The solid residue was extracted with ether to leave 8 parts of the sodium salt. This was suspended in 100 parts of dry dioxan and the suspension heated under gentle reflux during the addition of 12.1 parts of ethyl chlorofumarate in 20 parts of dioxan over 30 minutes. After a further 4 hours under reflux the mixture was evaporated to dryness, triturated with water and extracted with ether. The extracts were dried, charcoaled and evaporated to give an oil which was refluxed for three-fourths hour with 50 parts of 10 percent sodium hydroxide solution. The solution was acidified and extracted with ether. The ethereal extracts were washed with sodium hydrogen carbonate solution. The washings were acidified and extracted with ether. Evaporation of the solvent gave an oily solid which was triturated with cold concentrated sulphuric acid for one-half hour and then poured on to ice. The precipitated solid was recrystallized from ethanol to give 0.07 parts of 1,5-bis(2-carboxychromon-8-yl)pentane as a white solid, m.p. 228°–231°C.
Analysis:
Found: C, 67.1; H, 4.55%
$C_{25}H_{20}O_8$ requires: C, 66.96; H, 4.50% f. 1,5-Bis-(2-carboxychromon-8-yl)pentane disodium salt

To a solution of 1.68 parts of sodium hydrogen carbonate in water were added 4.48 parts of 1,5-bis(2-carboxychromon-8-yl)pentane. The clear solution was freeze-dried to give 4.8 parts of 1,5-bis(2-carboxychromon-8-yl)pentane disodium salt as a fine white powder.

EXAMPLE 7

N,N'-Bis(2-carboxychromon-6-yl)piperazine a. N,N'-Bis(4-methoxyphenyl)piperazine and N,N'-bis(4-methoxyphenyl)-1,2-diaminoethane A mixture of 73.8 parts of p-anisidine and 112.8 parts of 1,2-dibromoethane was warmed on a steambath. After 10 minutes an exothermic reaction set in and a white solid separated. When the reaction had subsided the mixture was heated on a steambath for another 80 minutes.

The mixture was then extracted repeatedly with boiling water and the residue was triturated with 20 percent aqueous sodium hydroxide solution, filtered off, and washed with water. Three crystallizations of this solid from dioxan gave 15.8 parts of N,N'-bis(4-methoxyphenyl)-piperazine, melting point 233°–246°C. The aqueous extract of the reaction mixture was made alkaline with aqueous sodium hydroxide solution and the precipitated solid was filtered off, and washed with water. Three crystallizations of this material from ethanol gave 15.4 parts of N,N'-bis(4-methoxyphenyl)-1,2-diaminoethane, melting point 103°–104°C.

b. N,N'-Bis(4hydroxyphenyl)piperazine

A mixture of 15.8 parts of N,N'-bis(4-methoxyphenyl) piperazine and 94.8 parts of pyridine hydrochloride was heated at 205°C for 4 hours. The hot liquid was then poured onto ice and the precipitated solid was filtered off and heated with ethanolic hydrogen chloride under reflux for 5 minutes. The brown solid was filtered off, dissolved in warm water and the resulting solution was basified with aqueous ammonia. The precipitate was filtered off and crystallized from ethanol to give 10.5 parts of N,N'-bis(4-hydroxyphenyl) piperazine as buff colored needles, decomposition point 240°C.
Analysis:
Found: C, 70.50; H, 6.72; N, 10.25%
$C_{16}H_{18}N_2O_2$ requires: C, 71.09; H, 6.71; N, 10.36% c. N,N'-Bis[4(1,2-trans-dicarboxyvinyloxy)phenyl] piperazine tetramethyl ester

To a suspension of 2.7 parts of N,N'-bis(4-hydroxyphenyl) piperazine and 3.0 parts of dimethyl acetylenedicarboxylate in 10 parts of 1,4-dioxan were added 0.5 parts of benzyltrimethylammonium hydroxide. The mixture was heated on a steam-bath for 1 hour. A solution of 2.0 parts of sodium hydroxide in 40 parts of water was then added and the mixture was stirred and heated on a steam-bath for 18 hours. After cooling, the suspension was filtered.

The residue was washed with water and crystallized from methanol to give 0.43 parts of N,N'-bis [4(1,2 - transmethoxycarbonylvinyloxy)phenyl'] piperazine, melting point 170°–2°C.
Analysis:
Found: C, 60.2; H, 5.50; N, 5.03%
$C_{28}H_{30}N_2O_{10}$ requires: C, 60.64; H, 5.45; N, 5.05%

The filtrate was washed with diethyl ether and was then acidified with dilute hydrochloric acid. The oily solid which had precipitated was filtered off and crystallized from water to give 1.15 parts of N,N'bis [4(1,2-trans-dicarboxyvinyloxy)phenyl] piperazine hemihydrate as a yellow solid, melting point 149°–51°C.
Analysis:
Found: C, 57.0; H, 4.84; N, 5.64%
$C_{24}H_{22}N_2O_{10}\cdot\frac{1}{2}H_2O$ requires: C, 56.9; H, 4.54; N, 5.52% d. N,N'-Bis(2-carboxychromon-6-yl)piperazine trihydrate 1.0 parts of N,N'-bis [4(1,2-trans-dicarboxyvinyloxy)phenyl] piperazine hemihydrate were added in small quantities to 5.0 parts of chlorosulphonic acid. After the careful addition of 5.0 parts of concentrated sulphuric acid the mixture was warmed to 50°C and kept at that temperature for 5 minutes. The mixture was poured slowly onto ice and the yellow precipitate was filtered off, washed with water and dried to give 0.15 parts of N,N'-bis(2-carboxychromon-6-yl) piperazine trihydrate, melting point 308°–10°C (decomposition).
Analysis:
Found: C, 55.0; H, 4.50; N, 5.11%
$C_{24}H_{18}N_2O_8\cdot 3H_2O$ requires: C, 55.7; H, 4.64; N, 5.42% e. N,N'-Bis(2-carboxychromon-6-yl)piperazine disodium salt

A mixture of 0.138 parts of sodium bicarbonate and 0.424 parts of N,N'-bis(2-carboxychromon-6-yl)piperazine trihydrate was dissolved in 60 parts of water. The solution was filtered and freeze-dried to give 0.4 parts of N,N'-bis(2-carboxychromon-6-yl) piperazine disodium salt as a yellow solid.

EXAMPLE 8

N,N'-bis(2-carboxychromon-6-ylcarbonyl)-1,2-diaminoethane a. N,N'-Bis(4-actoxybenzoyl)-1,2-diaminoethane To a solution of 2.0 parts of 1,2-diaminoethane and 3.0 parts of sodium hydroxide in 60 parts of water were added 13.2 parts of 4-acetoxybenzoyl chloride. The mixture was shaken for 5 minutes during which time much heat was evolved and a white solid was precipitated. The solid was filtered off, washed with water, and crystallized from ethanol to give 4.5 parts of N,N'-bis(4-acetoxybenzoyl)-1,2-diaminoethane as white needles, melting point 235°–8°C.
Analysis:
Found: C, 62.00; H, 5.55; N, 6.95%
$C_{20}H_{20}N_2O_6$ requires: C, 62.49; H, 5.24; N, 72.9% b. N,N'-Bis(3-acetyl-4-hydroxybenzoyl)-1,2-diaminoethane

An intimate mixture of 11.5 parts of N,N'-bis(4-acetoxybenzoyl)-1,2-diaminoethane, 24 parts of sodium chloride and 74 parts of aluminum chloride was kept at 175°C for 90 minutes. The resulting sticky mass was decomposed with ice and the solid residue was filtered and washed with water. The solid was dissolved in 5% aqueous sodium hydroxide solution and the solution was filtered and acidified with dilute hydrochloric acid. The precipitate was filtered, washed with water and crystallized from ethanol to give 5.7 parts of N,N'-bis(3-acetyl-4-hydroxybenzoyl)-1,2diaminoethane as yellow plates, melting point 236°–8°C.
Analysis:
Found: C, 63.2; H, 5.3; N, 7.1%
$C_{20}H_{20}N_2O_6$ requires: C, 62.49; H, 5.24; N, 7.29% c. N,N'Bis(2-ethoxycarbonylchromon-6-ylcarbonyl)-1,2-diaminoethane

To a stirred solution of sodium ethoxide in ethanol, prepared from 0.92 parts of sodium and 40 parts of ethanol, was added a mixture of 1.92 parts of N,N'-bis(3-acetyl-4-hydroxybenzoyl)-1,2-diaminoethane and 3.65 parts of diethyl oxalate in 40 parts of ethanol and 80 parts of anhydrous diethyl ether. The mixture was heated under reflux, with stirring, for 4 hours.

Diethyl ether and water were then added and the aqueous layer was separated off and acidified with dilute hydrochloric acid. The aqueous layer was then extracted with ethyl acetate and after drying the organic solution over anhydrous sodium sulphate the solvent was evaporated off.

The residual red oil was dissolved in ethanol and 0.5 parts of concentrated hydrochloric acid were added. The solution was heated under reflux for 10 minutes and was then allowed to cool. The yellow solid which crystallized was filtered and recrystallized from dioxan to give 1.2 parts of N,N'-bis(2-ethoxycarbonylchromon-6-ylcarbonyl)-1,2-diaminoethane as white microneedles, melting point 277°–280°C.
Analysis:
    Found: C, 61.1; H, 4.43; N, 5.07%
    $C_{28}H_{24}N_2O_{10}$ requires: C, 61.31; H, 4.41; N, 5.11% d. N,N'-Bis(2-carboxychromon-6-ylcarbonyl)-1,2-diaminoethane sesquihydrate

A mixture of 2.5 parts of N,N'-bis(2-ethoxycarbonylchromon-6-ylcarbonyl)-1,2-diaminoethane and 4.0 parts of sodium bicarbonate in 300 parts of water was stirred and heated on a steam bath for 1 hour. The resulting solution was filtered, cooled and acidified with dilute hydrochloric acid. The precipitate was filtered, washed with water and dried to give 1.6 parts of N,N'-bis(2-carboxychromon-6-ylcarbonyl)-1,2-diaminoethane sesquihydrate as a white solid, melting point 300°–302°C.
Analysis:
    Found: C, 55.5; H, 3.90; N, 5.36%
    $C_{24}H_{16}N_2O_{10}·1½H_2O$ requires: C, 55.5; H, 3.67; N, 5.39% e. N,N'-Bis(2-carboxychromon-6-ylcarbonyl)-1,2-diaminoethane disodium salt.

A solution of 1.08 parts of N,N'-bis(2-carboxychromon-6-ylcarbonyl)-1,2-diaminoethane sesquihydrate and 0.35 parts of sodium bicarbonate in 150 parts of water was freeze-dried to give 1.0 parts of N,N'-bis(2-carboxychronom-6-ylcarbonyl)-1,2-diaminoethane disodium salt as a cream colored solid.

EXAMPLE 9

N,N'-Bis(2-carboxychromon-6-ylcarbonyl)-1,3-diaminopropane a. N,N'-Bis(4-acetoxybenzoyl)-1,3-diaminopropane By the method of Example 8 (a) 8.25 parts of 1,3-diaminopropane were treated with 40.0 parts of 4-acetoxybenzoyl chloride to give 12.3 parts of N,N'-bis(4-acetoxybenzoyl-1,3-diaminopropane which crystallized from ethanol as a white solid, melting point 196°–8C.
Analysis:
    Found: C, 63.3; H, 5.48; N, 6.81%
    $C_{21}H_{22}N_2O_6$ requires: C, 63.31; H, 5.57; N, 7.03% b. N,N'-Bis(3-acetyl-4-hydroxybenzoyl)-1,3-diaminopropane

By the method of Example 8 (b) 18.0 parts of N,N'-bis(4-acetoxybenzoyl)-1,3diaminopropane were treated with a mixture of 70.0 parts of aluminum chloride and 20.0 parts of sodium chloride to give 8.0 parts of N,N'-bis(3-acetyl-4-hydroxybenzoyl)-1,3-diaminopropane as a white solid, melting point 199°–201°C.
Analysis:
    Found: C, 62.9; H, 5.68; N, 7.05%
    $C_{21}H_{22}N_2O_6$ requires: C, 63.31; H, 5.57; N, 7.03% c. N,N'-Bis(2-ethoxycarbonylchromon-6-ylcarbonyl)-1,3-diaminopropane hemihydrate By the method of Example 8 (c) 3.98 parts of N,N'-bis(3-acetyl-4-hydroxybenzoyl)-1,3-diaminopropane were treated with 7.3 parts of diethyl oxalate to give 1.6 parts of N,N'-bis(2-ethoxycarbonylchromon-6-ylcarbonyl)-1,3-diaminopropane hemihydrate as a white solid, melting point 223°–226°C.
Analysis:
    Found: C, 60.9; H, 4.72; N, 4.99%
    $C_{29}H_{26}N_2O_{10}·½H_2O$ requires: C, 61.0; H, 4.73; N, 4.90% d. N,N'-Bis(2-carboxychromon-6-ylcarbonyl)-1,3-diaminopropane monohydrate

By the method of Example 8 (d) 1.2 parts of N,N'-bis(2-ethoxycarbonyl-chromon-6-ylcarbonyl)-1,3-diaminopropane hemihydrate were treated with 3.0 parts of sodium bicarbonate to give 0.9 parts of N,N'-bis(2-carboxychromon-6-ylcarbonyl)-1,3-diaminopropane monohydrate as a fawn colored solid, melting point 260°–3°C (decomposition).
Analysis:
    Found: C, 56.9; H, 3.99; N, 5.35%
    $C_{25}H_{18}N_2O_{10}·H_2O$ requires: C, 57.2; H, 3.82; N, 5.35% e. N,N'Bis(2-carboxychromon-6-ylcarbonyl)-1,3-diamino-propane disodium salt

A solution of 0.5 parts of N,N'-bis(2-carboxychromon-6-ylcarbonyl)-1,3-diaminopropane monohydrate and 0.16 parts of sodium bicarbonate in 150 parts of water was freeze-dried to give 0.46 parts of N,N'-bis(2-carboxychromon-6-ylcarbonyl)1,3-diaminopropane disodium salt as a cream colored solid.

EXAMPLE 10

N,N'-Bis(2-carboxychromon-6-ylcarbonyl)-1,6-diaminohexane a. N,N'-Bis(4-acetoxybenzoyl)-1,6-diaminohexane By the method of Example 8(a) 2.32 parts of 1,6-diaminohexane were treated with 7.96 parts of 4-acetoxybenzoyl chloride to give N,N'-bis(4-acetoxybenzoyl)-1,6-diaminohexane as a white solid, melting point 199°–201°C.
Analysis:
    Found: C, 65.40; H, 6.40; N, 6.30%
    $C_{24}H_{28}N_2O_6$ requires: C, 65.44; H, 6.41; N, 6.36% b. N,N'-Bis(3-acetyl-4-hydroxybenzoyl)-1,6-diaminohexane

By the method of Example 8(b) 18.0 parts of N,N'-bis(4-acetoxybenzoyl)-1,6-diaminohexane were treated with a mixture of 75.0 parts of aluminum chloride and 16.5 parts of sodium chloride to give N,N'-bis(3-acetyl-4-hydroxybenzoyl)-1,6-diaminohexane as a white solid, melting point 209°–211°C.
Analysis:
    Found: C, 65.50; H, 6.56; N, 6.28%
    $C_{24}H_{28}N_2O_6$ requires: C, 65.44; H, 6.41; N, 6.36% c. N,N'-Bis(2-ethoxycarbonylchromon-6-ylcarbonyl)-1,6-diaminohexane

By the method of Example 8 (c) 4.4 parts of N,N'-bis(3-acetyl-4-hydroxybenzoyl)-1,6-diaminohexane were treated with 7.3 parts of diethyl oxalate to give N,N'-bis(2-ethoxycarbonylchromon-6-ylcarbonyl)-1,6-diaminohexane as a white solid, melting point 255°–7C.
Analysis:
    Found: C, 63.00; H, 5.17; N, 4.67%
    $C_{32}H_{32}N_2O_{10}$ requires: C, 63.6; H, 5.30; N, 4.64% d. N,N'-Bis(2-carboxychromon-6-ylcarbonyl)-1,6-diaminohexane disodium salt trihydrate A solution of 1.78 parts of sodium hydroxide in 20 parts of ethanol and 0.5 parts of water was added to a suspension of 1.34 parts of N,N'-bis(2-ethoxycarbonylchromon-6-ylcarbonyl)-1,6-diaminohexane in 20 parts of boiling ethanol. The mixture was heated under reflux for 20 minutes. After cooling, water was added and the solution was filtered. Most of the water was removed by azeotropic distillation using benzene. On cooling, N,N'-bis(2-carboxychromon-6-carbonyl)-1,6-diaminohexane trihydrate crystallized as a pale yellow solid.

Analysis:
Found: C, 51.40; H, 3.94; N, 4.11%
$C_{28}H_{22}N_2Na_2O_{10} \cdot 3H_2O$ requires: C, 52.00; H, 4.33; N, 4.33%

We claim:

1. A compound selected from the group consisting of the formula

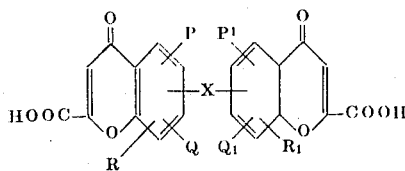

and pharmaceutically acceptable salts, esters derived from alcohols containing 1–10 carbon atoms and amides derived from ammonia, primary or secondary lower alkyl amines or aniline,
wherein X is selected from the group consisting of benzene, naphthalene, cyclopentadiene, cycloheptane, cyclopentane, cyclohexane, pyridine, piperidine, piperazine, pyrazine, pyrrolidine, morpholine and pyrone rings, optionally substituted by hydroxy, halogen or lower alkyl, and straight or branched, saturated or unsaturated hydrocarbon chains containing 2–10 carbon atoms, optionally interrupted by at least one of the carbocyclic or heterocyclic rings specified above or by an oxygen or nitrogen atom, and
$P, Q, R, P_1, Q_1$ and $R_1$ are the same or different and each is selected from the group consisting of hydrogen, nitro, amino, amino lower alkoxy, cyano, halogen, hydroxy, lower alkyl, lower alkenyl, lower alkynyl, lower alkoxy, lower alkenyloxy and lower alkynyloxy groups, optionally substituted by at least one of hydroxy, halogen, lower alkyl and lower alkoxy.

2. The compound according to claim 1, wherein X is selected from the group consisting of pyridine, piperidine, piperazine, pyrazine, pyrrolidine and morpholine rings and saturated or unsaturated, straight or branched polymethylene chains containing 2–10 carbon atoms, optionally substituted by at least one of halogen, carbonyl oxygen, lower alkyl, lower alkoxy and hydroxyl, and which chains may optionally be interrupted by at least one of oxygen atoms and

groups.

3. The compound according to claim 1, wherein X is selected from the group consisting of $-CONH(CH_2)_p$ NHCO$-$, $-CH_2CHOHCH_2-$ and $-(CH_2)_p$ wherein $p$ is an integer of from 2 to 8.

4. The compound according to claim 1 in the form of a the pharmaceutically acceptable salt, ester or amide.

5. The compound according to claim 1 in the form of a sodium salt.

6. The compound according to claim 1, namely 1,5-Bis(2-carboxychromon-6-yl)pentane.

7. The compound according to claim 1, namely 1,6-Bis(2-carboxychromon-6-yl)hexane.

8. The compound according to claim 1, namely 1,3-Bis(2-carboxychromon-6-yl)propane.

9. The compound according to claim 1, namely 1,5-Bis(2-carboxychromon-6-yl)pentan-3-ol.

10. The compound according to claim 1, namely 1,5-Bis(2-carboxychromon-6-yl)pentan-2-ene.

11. The compound according to claim 1, namely 1,5-Bis(2-carboxychromon-8-yl)pentane.

12. The compound according to claim 1, namely N,N'-Bis(2-carboxychromon-6-yl)piperazine.

13. The compound according to claim 1, namely N,N'-Bis(2-carboxychromon-6-yl carbonyl)-1,2-diamino-ethane.

14. The compound according to claim 1, namely N,N'-Bis(2-carboxychromon-6-yl carbonyl)-1,3-diamino-propane.

15. The compound according to claim 1, namely N,N'-Bis(2-carboxychromon-6-yl carbonyl)-1,6-diamino-hexane.

16. A compound selected from the group consisting of the formula

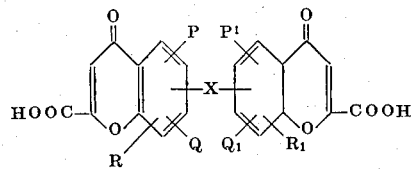

and pharmaceutically acceptable salts, esters derived from alcohols containing 1–10 carbon atoms and amides derived from ammonia, primary or secondary lower alkyl amines or aniline,
wherein X is selected from the group consisting of pyridine, piperidine, piperazine, pyrazine, pyrrolidine and morpholine rings and saturated or unsaturated, straight or branched polymethylene chains containing 2–10 carbon atoms, optionally substituted by halogen, carbonyl oxygen or hydroxyl, and which chains may optionally be interrupted by an oxygen atom or

group, and
$P, Q, R, P_1, Q_1$ and $R_1$ are the same or different and each is a hydrogen, hydroxy, halogen, amino, nitro, lower alkyl, lower alkenyl, lower alkoxy or lower alkenyloxy group, which groups are optionally substituted by a halogen, hydroxy, lower alkyl or lower alkoxy.

* * * * *